UNITED STATES PATENT OFFICE 2,548,102

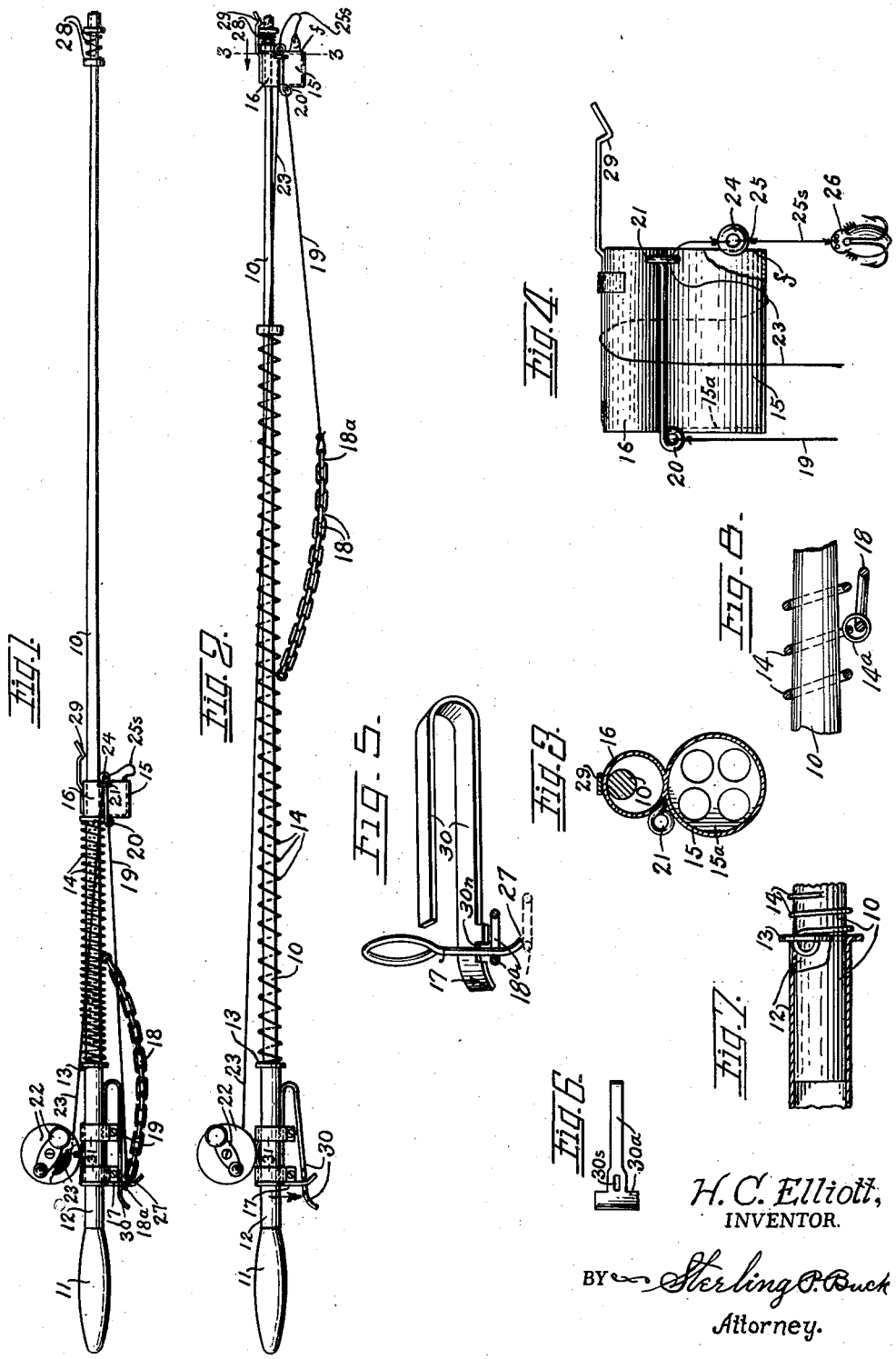

FISHING POLE WITH AUTOMATIC LURE-CASTING ATTACHMENTS

Homer C. Elliott, Baltimore, Md.

Application July 21, 1949, Serial No. 106,041

8 Claims. (Cl. 43—19)

1

This invention relates to a fishing pole with automatic lure-casting attachments.

One object of this invention is to improve upon other devices of this type by arranging very simple and effective casting and controlling means on and around a simple form of tapered springy fishing pole that can be used for playing or plying a hooked fish yieldingly while reeling in the line to which the fish is attached.

Another object of the invention is to provide for variously adjusting the tension or compression of the casting spring, so as to shoot or throw the bait or lure various distances, according to any particular near or farther location where the user judges fish are likely to be lurking.

Another object is to use the lure-casting carrier for supporting a fishing line-guide or eye at the front end-portion of the fishing pole, so that the pull on the fishing line is at the most flexible part of the pole when a fish is being pulled in.

Other objects and important features are pointed out or implied in the following details of description in connection with the accompanying drawings in which:

Fig. 1 is a right-side view of the combination that constitutes one form of my invention, the casting elements being shown in readiness for casting.

Fig. 2 is a right-side view of all elements shown in Fig. 1, but in the position at the instant the lure-carrier has reached the end of its forward motion on the fishing pole, and the bait or lure has started from the carrier by its impetus received from the expanding of the spring.

Fig. 3 is an enlarged sectional view along the line 3—3 of Fig. 2.

Fig. 4 is an enlarged right-side view of the lure-carrier and adjuncts united therewith, a portion of the fishing-line being wound around the lure-carrier for sustaining the line puller 24, snell 25s and bait or lure 26 in a pending position from the eye 21.

Fig. 5 is an enlarged perspective view of the manipulative device and restraining means shown in Figs. 1 and 2, parts being shown in section.

Fig. 6 is an under-side view of a modified form of the device shown in Figs. 1, 2 and 5, and interchangeable therewith.

Fig. 7 is an enlarged fragmental, detailed view showing a simple means of fixing the spring 14 to the abutment 13 which is a flange-end of the shank 12.

Fig. 8 is a fragmental detail view showing how the chain 18 is secured to the spring 14 by a link 14a.

Referring to these drawings in detail, in which, similar reference numerals refer to similar parts throughout the several views, the invention is described in detail as follows:

In broad terms, this invention comprises a pole 10 that is evenly and forwardly tapered substantially throughout its length, a handle 11, and a reel-attaching shank 12, all normally united in mutual alinement and provided with an abutment 13 at the larger or rear end of said pole 10, in combination with a helical compression spring 14 around said pole and having its rear end normally against said abutment. A lure-carrier 15 has an open front end $f$, and includes a tubular element 16 around and slidable along said pole 10. Restraining means 17, 18, 19, 20 are engaged with said shank 12 and with said lure-carrier in a proper relation to compress said spring and thereby store motive power therein. A line-guiding eye-member 21 is provided on said lure-carrier, a reel 22 is secured on said shank 12, a fishing line 23 has a part wound on said reel and a part extending from the reel to and through the said eye-member 21 and a line-pulling unit 24 is engaged with said fishing line 23 and thereby held normally substantially at the front side of said eye-member 21 and is too large to be passed through said eye-member and is adapted to have a snell and lure attached thereto (at 25), while the body of the lure (at 26) is either in or out of said lure-carrier 15.

Said restraining means is operable by manipulation so as to be separated at 27 (Fig. 1), and to release said lure-carrier from restraint and permit it to be shot forward by motive power of said spring 23 from its position in Fig. 1 to that in Fig. 2.

Said restraining means comprises a detent 17 united with said shank 12, and a flexible connector 18—19 having its front end engaged with said lure-carrier 15 by the unit that includes eyes 20 and 21 (Fig. 4), while a rearward portion of it is engaged with said detent 17 so as to cooperate with said lure-carrier 15 in compressing said spring 14 for storing motive power in this spring. One end of the flexible connector is engaged with an intermediate part of said spring 14, and the linked part 18 of said flexible connector includes openings through the links interchangeably engageable with said detent 17 for cooperation with the lure-carrier in compressing said spring and being released from the detent 17 so that lure-carrier can be shot forward by expansion of said spring when released from its compression. The front end-portion of said pole projects considerably beyond the front end of said spring 14 when the spring is fully expanded, and said lure-carrier 15 is free to leave the front end of said spring and travel along said front end-portion by its inherent impetus. Shock-absorbing means 28 is provided on the front end of said pole 10 for stopping said lure-carrier substantially at the front end of the pole, and latching means 29 is provided to detachably secure said lure-carrier 15 against said shock-absorbing means 28. The rear end of said spring 14 is fixedly secured at said abutment 13, as shown in Fig. 7. Because the flexible connector 18—19 has its front end secured to said lure-carrier while its rear end is secured to an intermediate part of said spring 14, the entire flexible connector is carried forward by said spring to a position where it cooperates with said spring to gradually retard the impetus of said lure-carrier as the latter approaches the front end of said pole 10.

Though different link-openings of the element 18 can be engaged with the detent 17, for varying extent of compression of spring 14, and any one of the links can be disengaged from the detent by direct manipulation, a spring lever 30 (Figs. 1, 2, 5), or a modified form thereof (Fig. 6) is preferably provided and secured on the shank 12 by means of the same clamps 31 that secure the reel 22 in place.

The normal position of the spring-lever 30 is shown in Fig. 1, making room for the link 18a to engage with the vertical part of the detent 17; but in Fig. 2, the spring-lever 30 is shown pressed down, by a user's thumb (on the point shown at the arrow) on the curved free end of lever 30. Lever 30 has a notch 30n through which the detent 17 normally extends, and when the lever 30 is pressed down, the edges of this notch press the engaged link of the chain or flexible element 18 down to a point where it slides away from the detent 17, and is swung to the position shown in Fig. 2, under impulse of the spring 14 and carrier 15.

When the lever 30a is used instead of the lever 30, the detent 17 projects through the slot 30s, and the broader free end permits access of a thumb at either the right or left side of the shank 12. The elements 15 and 16 may be formed of plastic; and the eyes 20 and 21 can (either or both) be molded integrally therewith; but if formed separately, the eyes 20 and 21 may be formed on opposite ends of a length of wire and be united therewith and with elements 15 and 16 by cement, solder, welding or other appropriate means.

The rear wall 15a, of the element 15, may well be perforated as shown in Fig. 3, or apertured to minimize weight and air resistance, thereby to maximize its speed and lure-throwing force.

Although I have described this form of my invention quite specifically, I have no intention to limit my patent protection to these precise details as illustrated and described, for the invention is susceptible of numerous changes within the scope of the inventive ideas, as implied and claimed.

My invention is claimed as follows:

1. In a fishing device, a pole that is uniformly and forwardly tapered substantially throughout its length, a handle, and a reel-attaching shank, all normally united in mutual alinement and provided with an abutment at the larger or rear end of said pole, in combination with a helical compression spring around said pole and having its rear end normally against said abutment, a lure-carrier that has an open front end and includes a tubular element around and slidable along said pole, restraining means engaged with said shank and with said lure-carrier in a proper relation to compress said spring and thereby store motive power therein, a line-guiding eye-member on said lure-carrier, a reel on said shank, a fishing line having a part wound on said reel and a part extending from the reel to and through the said eye-member, and a line-pulling unit engaged with said line and thereby held normally substantially at the front side of said eye-member and being too large to be passed through said eye-member and adapted to have a snelled lure attached thereto while the body of the lure is either in or out of said lure-carrier, said restraining means being operable by manipulation so as to release said lure-carrier from restraint and permit it to be shot forward by motive power of said spring.

2. In the combination defined by claim 1, said restraining means comprising a detent united with said shank, and a flexible connector having its front end engaged with said lure-carrier while a rearward portion of it is engaged with said detent so as to cooperate with said lure-carrier in compressing said spring for storing motive power in the spring.

3. In the combination defined by claim 1, said restraining means comprising a detent located in rear of the rear end of said pole, and a flexible connecter having its front end engaged with said lure-carrier while its other end is engaged with an intermediate part of said spring, an intermediate part of said flexible connector being engageable with said detent for cooperation with the lure-carrier in compressing said spring and being releaseable from said detent so the lure-carrier can be shot forward by said spring.

4. In the combination defined by claim 1, the front end-portion of said pole projecting a considerable distance beyond the front end of said spring when the spring is fully expanded, said lure-carrier being free to leave the front end of said spring and travel along said front end-portion by its inherent impetus, shock-absorbing means on the front end of said pole for stopping said lure-carrier substantially at the front end of the pole, and latching means to detachably secure said lure-carrier against said shock-absorbing means.

5. In the combination defined by claim 1, the rear end of said spring being fixedly secured at said abutment, said flexible connector having its front end secured to said lure-carrier while its rear end is secured to an intermediate part of said spring so that the entire flexible connector is carried forward by said spring to a position where it cooperates with said spring to gradually retard the impetus of said lure-carrier as the latter approaches the front end of said pole.

6. The combination defined by claim 5, and means on the front end of said pole to cushion the impact of said lure-carrier while stopping the latter and effecting a latching engagement with the latter.

7. In the combination defined by claim 1, said restraining means comprising a detent located rearward of the rear end of said pole, and a flexible connector that includes a front end secured to said lure-carrier and includes a part that has a series of openings therealong for interchangeably receiving a portion of said detent so it is cooperative with said lure-carrier for varying the extent of compression of the spring and thus varying the motive power stored therein at will of the user.

8. In the combination defined by claim 1, said restraining means comprising a flexible connector secured to said lure-carrier, a detent for engagement with and release from said flexible connector, and manipulative means near enough to said handle to be reached and manipulated by the thumb of a hand that is grasping said handle.

HOMER C. ELLIOTT.

REFERENCES CITED

The following references are of record in the file of this patent:

UNITED STATES PATENTS

| Number | Name | Date |
|---|---|---|
| 1,009,553 | Neuman | Nov. 21, 1911 |
| 1,434,768 | Boggess | Nov. 7, 1922 |
| 1,469,883 | Brakers | Oct. 9, 1923 |
| 1,571,751 | Castellan | Feb. 2, 1926 |